(12) United States Patent
Tamai et al.

(10) Patent No.: US 11,602,745 B2
(45) Date of Patent: Mar. 14, 2023

(54) INTEGRATED PIPETTING APPARATUS

(71) Applicant: Muscle Lab Canada Inc., Richmond Hill (CA)

(72) Inventors: Hirofumi Tamai, Osaka (JP); Chaojun Zhou, Richmond Hill (CA)

( * ) Notice: Subject to any disclaimer, the term of this patent is extended or adjusted under 35 U.S.C. 154(b) by 164 days.

(21) Appl. No.: 16/632,436

(22) PCT Filed: Apr. 6, 2018

(86) PCT No.: PCT/IB2018/052422
§ 371 (c)(1),
(2) Date: Jan. 20, 2020

(87) PCT Pub. No.: WO2019/193404
PCT Pub. Date: Oct. 10, 2019

(65) Prior Publication Data
US 2021/0008544 A1    Jan. 14, 2021

(51) Int. Cl.
*B01L 3/02* (2006.01)
*G01N 35/10* (2006.01)

(52) U.S. Cl.
CPC .......... *B01L 3/0237* (2013.01); *B01L 3/0227* (2013.01); *G01N 35/1011* (2013.01); *G01N 35/1072* (2013.01); *B01L 2200/146* (2013.01); *G01N 2035/1025* (2013.01)

(58) Field of Classification Search
None
See application file for complete search history.

(56) References Cited

U.S. PATENT DOCUMENTS

| | | | |
|---|---|---|---|
| 4,794,085 A | 12/1988 | Jessop et al. | |
| 6,641,545 B1 | 11/2003 | Colin et al. | |

FOREIGN PATENT DOCUMENTS

| | | | |
|---|---|---|---|
| EP | 11486 A | * | 8/1984 |
| EP | 210014 A2 | * | 1/1987 |
| WO | WO-2022035768 A1 | * | 2/2022 |

* cited by examiner

*Primary Examiner* — P. Kathryn Wright
(74) *Attorney, Agent, or Firm* — Nasser Ashgriz; UIPatent Inc.

(57) ABSTRACT

A pipette module 10 has a pipette-module frame 12 attachable to the z-axis frame 120 of a liquid handling system 100. A translatory-motion frame 14 attached to the pipette-module frame 12 is movable with respect thereto by a motor 16. A pneumatic aspirator assembly 18 including a cylinder 20, tube 24, tube tip 26 and pressure sensor 28 is attached to the translatory-motion frame 14. A piston 22 disposed in the cylinder 20 is fixedly attached to the frame 12. A controller 30 for the pipette module 10 has a liquid surface detection mode which enables a pressure feedback control algorithm causing the motor 16 to move the translatory-motion frame 14 in a z-axis translator motion until a change in a pressure in the tip 26 as sensed by the pressure sensor 28 indicates that the tip 26 has made contact with the liquid surface 110.

11 Claims, 10 Drawing Sheets

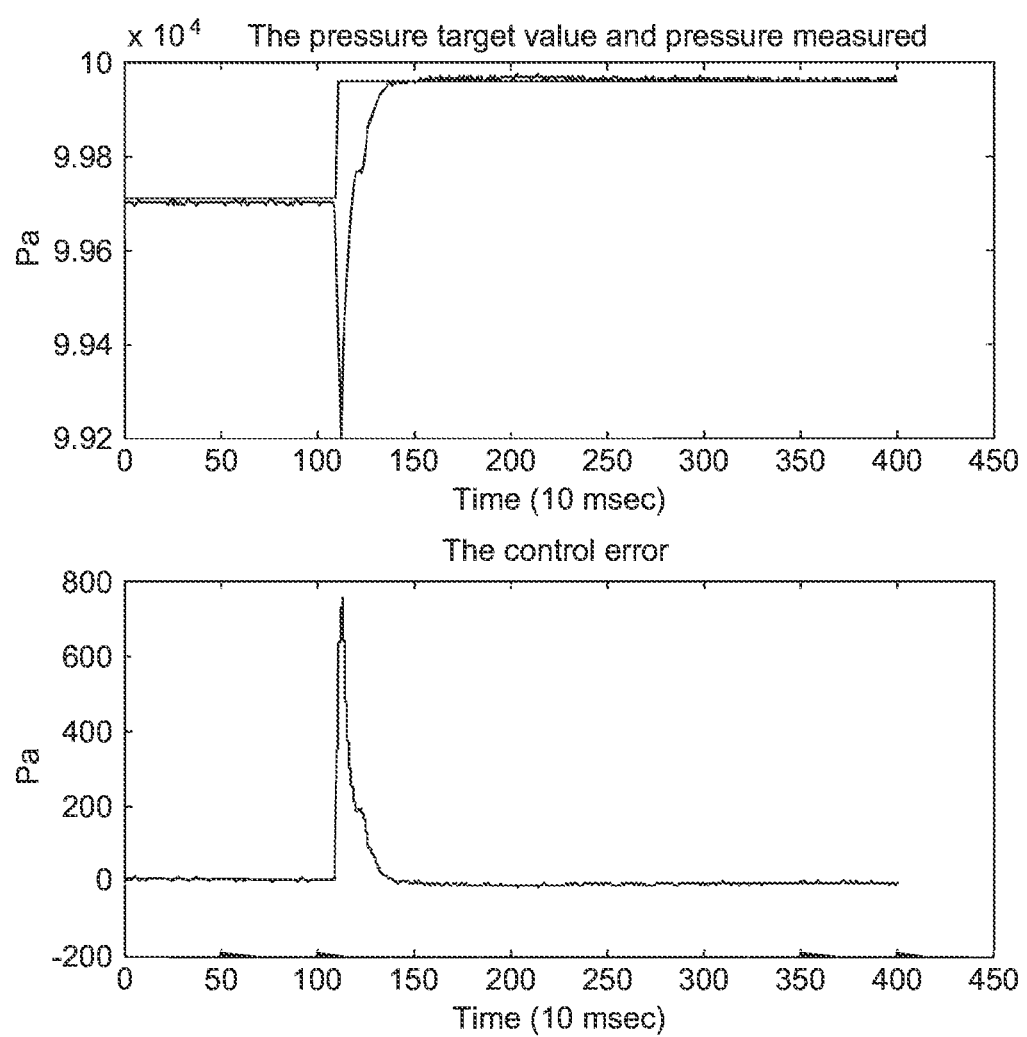
*Fig. 8.1*

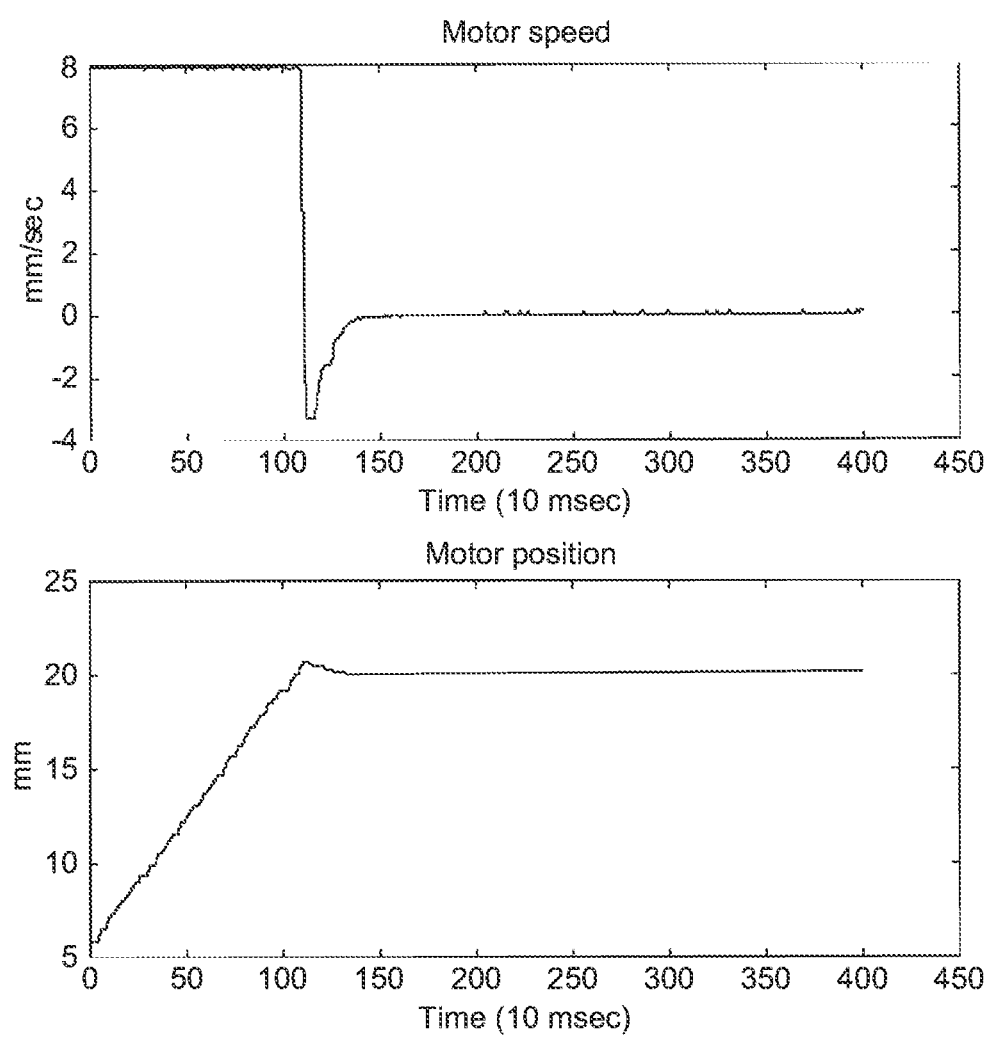
Fig. 8.2

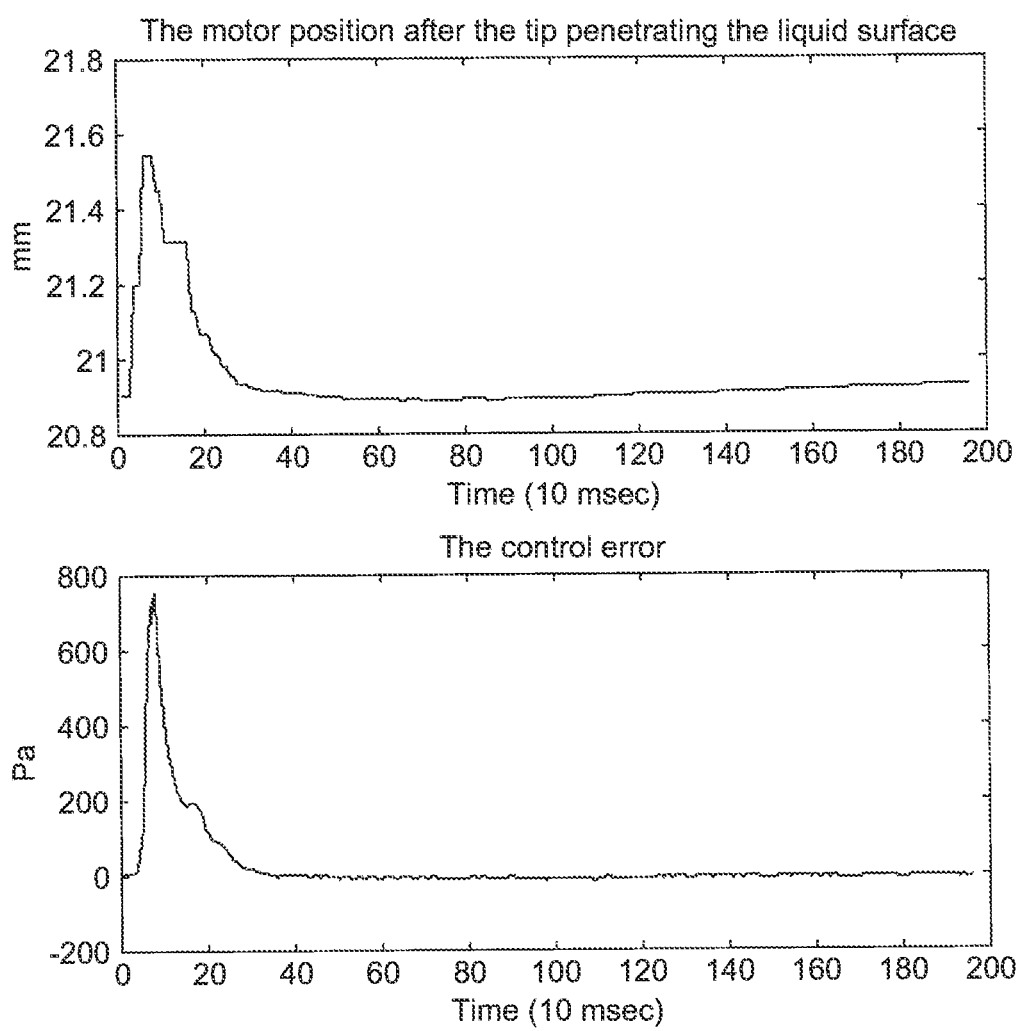
Fig. 8.3

INTEGRATED PIPETTING APPARATUS

BACKGROUND OF THE INVENTION

The present invention relates to a liquid handling system for aspirating a liquid from at least one container and dispensing the aspirated liquid into another container. More particularly, the present invention relates a liquid handling system having a pipette module as a core component.

In general, conventional liquid handling systems comprise a plurality of pipette modules and associated processor-controlled, motor-driven mechanical sub-assemblies. The mechanical sub-assemblies include pipette supporting frames that move along a z-axis raising and lowering one or more pipette tips relative to the containers holding the liquid to be aspirated. Due to these interrelated mechanisms, the structure of liquid handling systems is very complex. The pipette modules need to move in the z-axis to find the liquid level as well as aspirate and dispense liquids (during which the liquid level changes). Since the mass of the pipette modules are large in general, and since there is backlash between moving parts due to manufacturing tolerances, longitudinal movements produce considerable strain on the mechanisms.

U.S. Pat. No. 6,641,454 B1 (Colin et al.), hereafter referred to as "Colin" is directed to an apparatus and method for aspirating a biological fluid contained in a specimen holder. More specifically, Colin discloses a pipette having a cylindrical body containing a piston, the movement of which provides for both the suction and discharge of the fluid to be aspirated. In use, as a mechanism to which the pipette is attached brings a tip of the free end of the pipette close to the surface of the biological fluid, movement of the piston expels from the tip a continuous and constant flow of air. When an over-pressure of the air in the tip is determined to be greater than a predetermined threshold as the tip approaches the liquid surface, the tip end is deemed to be in flush contact with the liquid surface, the flow of air from the tip is stopped as is movement of the tip, and aspiration of the fluid is initiated. An inherent and undesirable feature of the Colin device and method is that movement of the inlet and outlet air flow for the liquid surface detection is set independent of the speed at which the pipette tip moves.

U.S. Pat. No. 4,794,085 (Jessop et al), hereafter referred to as "Jessop", is directed to an apparatus and method for aspirating a liquid contained in a sample container and dispensing the aspirated liquid thereafter. More specifically, Jessop discloses an aspiration control system for a liquid dispensing apparatus comprising a probe for receiving a liquid to be aspirated from the sample container and a piston chamber movable with the probe. A pressure line in fluid communication with the probe and the piston chamber provides a partial vacuum or a partial pressure, relative to atmospheric pressure, to the probe in response to movement of a piston in the piston chamber. The aspiration control system coordinates the actuation of a motor driving the movement of the probe and another motor driving the movement of the piston in response to the change in pressure sensed in the probe. Detection of the penetration of the air-liquid interface by the probe is achieved by repeated incremental aspiration of air and movement of the probe until an over-pressure (a pressure drop) of the air in the probe is determined to be greater than a predetermined threshold at which time the probe is deemed to have penetrated the liquid.

An inherent and undesirable feature of the Jessop apparatus and method is that the elapsed time required by the repeated incremental aspiration and probe movement to detect and penetrate the liquid surface may limit the speed at which aspiration and dispensation of the liquid is achievable.

Accordingly, for the reasons set forth above, there is a need in the art for precision control of the plurality of pipette modules and associated processor-controlled, motor-driven mechanical sub-assemblies comprising liquid handling systems.

BRIEF SUMMARY OF THE INVENTION

Briefly stated, a preferred embodiment of the present invention is directed to a pipette module for a liquid handling system including a liquid-handling-system z-axis frame, at least one container with a container open end having a predetermined container-open-end position relative to the liquid-handling-system z-axis frame and a liquid having a liquid surface with an unknown liquid surface level in the at least one container. The pipette module has a pipette-module frame attachable to the liquid-handling-system z-axis frame. A pipette-module translatory-motion frame is attached to the pipette-module frame and is movable with respect to the pipette-module frame by a pipette-module motor. A pneumatic aspirator assembly comprises a pipette-module cylinder having a piston movably disposed therein. A tube is in fluid communication with the pipette-module cylinder. The tube terminates in a tip. A pressure sensor is in fluid communication with the cylinder, the tube and the tip. A pipette-module controller is in electrical communication with the pipette-module motor and the pressure sensor. The pipette-module cylinder, the tube and the tip are attached to the pipette-module translatory-motion frame and movable therewith. The piston is fixedly attached to the pipette-module frame by a piston rod. The pipette-module controller has a liquid surface detection mode of operation which enables a pressure feedback control algorithm that causes the pipette-module motor to move the pipette-module translatory-motion frame in a z-axis translatory motion until a change in a pressure in the tip as sensed by the pressure sensor indicates that the tip is in contact with the liquid surface.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, the drawings show embodiments which are presently preferred. It should be understood, however, that the invention is not limited to the precise arrangements and instrumentalities shown.

In the drawings:

FIG. 8.1 is a representative graphic for the pressure inside a pipette tip and the associated control error during detection of the liquid surface of water in a container;

FIG. 8.2 is a representative graphic for the speed and position of the pipette-module motor associated with the graphic of FIG. 8.1; and FIG. 8.3 is a portion of the graphics of FIGS. 8.1 and 8.2 showing motor position and associated control error after the pipette tip penetrates the liquid surface.

DETAILED DESCRIPTION OF THE INVENTION

Figure 1:
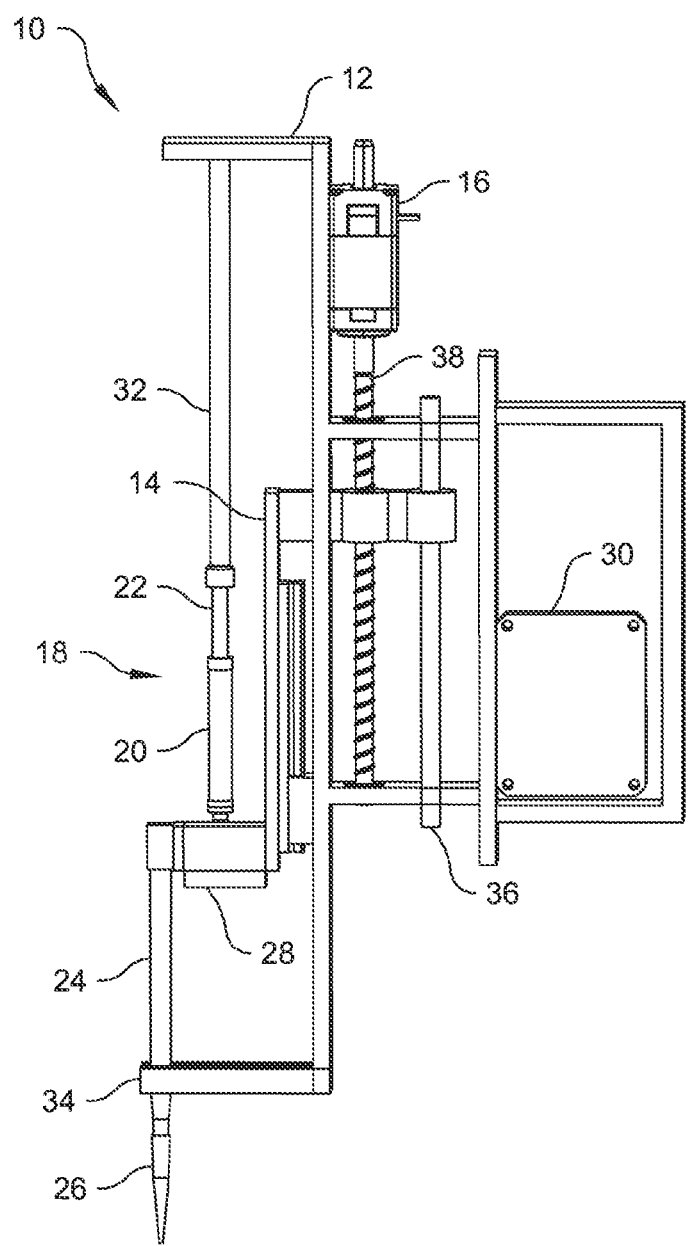
FIG. 1 is a side elevation view of a first preferred embodiment of the pipette module in accordance with the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the needle safety shield, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first cylinder could be termed a second cylinder, and, similarly, a second cylinder could be termed a first cylinder, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a integrated pipetting apparatus in accordance with the present invention.

Figure 2:
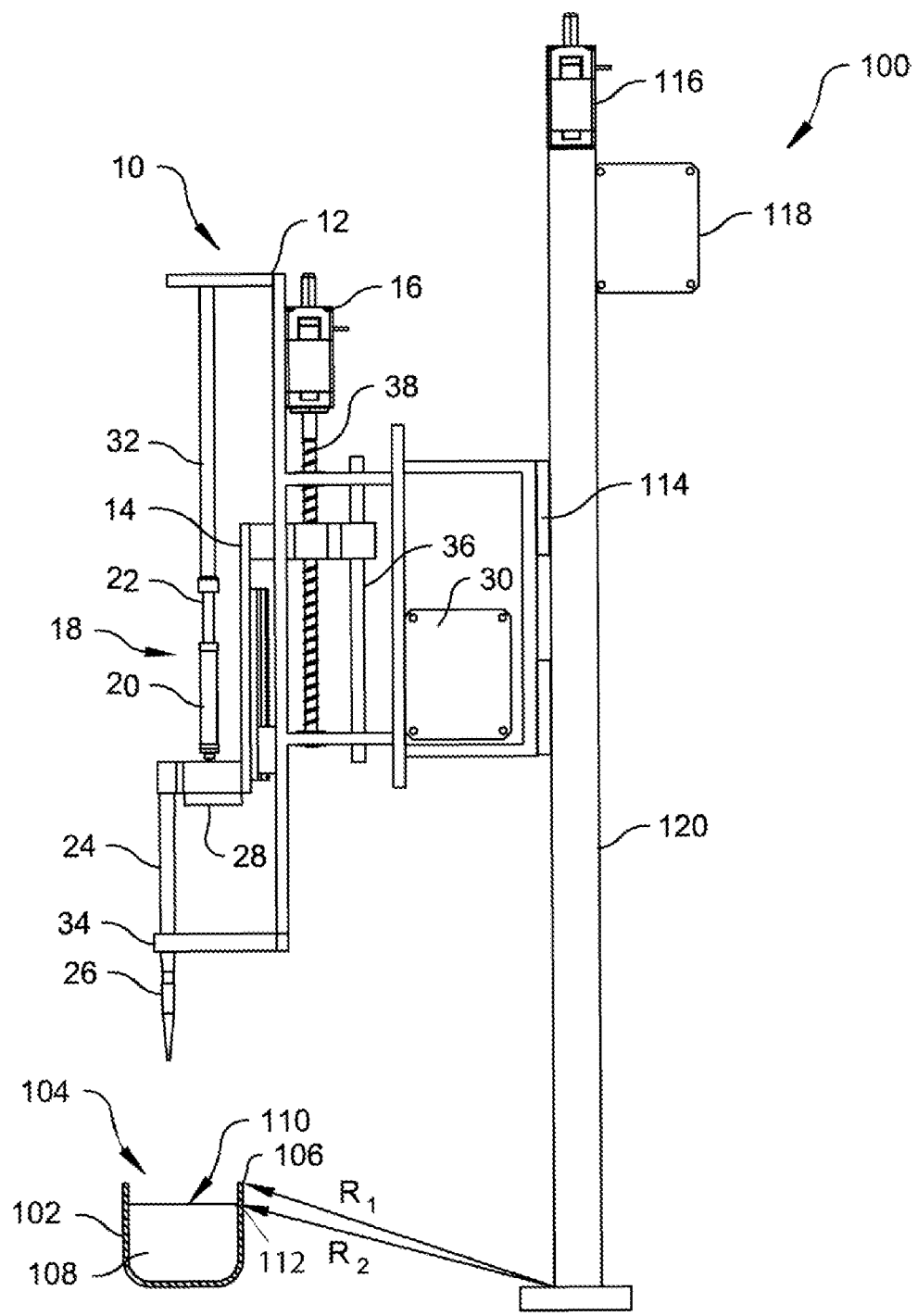
FIG. 2 is a side elevation view of a liquid handling system including the pipette module of FIG. 1 in accordance with the present invention.

Referring to the drawings in detail, where like numerals indicate like elements throughout, there is shown in FIGS. 1 and 2 a first preferred embodiment of the pipette module, generally designated 10, and hereinafter referred to as the "pipette module" 10 in accordance with the present invention. The pipette module 10 is for use in a liquid handling system 100 including a liquid-handling-system z-axis frame 120 and at least one container 102 with a container open end 104 having a predetermined container-open-end position 106 ($R_1$) relative to the liquid-handling-system z-axis frame 120. A liquid 108 in the at least one container 102 has a liquid surface 110 at an unknown liquid surface level 112 ($R_2$) relative to the position of the container open end.

The pipette module 10 has a pipette-module frame 12 attachable to the liquid-handling-system z-axis frame 120. A pipette-module translatory-motion frame 14 is attached to the pipette-module frame 12 and is movable with respect to the pipette-module frame 12 by a pipette-module motor 16.

Further, the pipette module 10 has a pneumatic aspirator assembly 18 comprising a pipette-module cylinder 20 having a piston 22 movably disposed therein. A tube 24 is in fluid communication with the pipette-module cylinder 20. The tube 24 terminates in a tip 26. A pressure sensor 28 is provided and is in fluid communication with the cylinder 20, the tube 24 and the tip 26. The pipette-module cylinder 20, the tube 24, the tip 26 and the pressure sensor 28 are attached to the pipette-module translatory-motion frame 14 and are movable therewith. The piston 22 is fixedly attached to the pipette-module frame 12 by a piston rod 32.

Still further, the pipette module 10 has a pipette-module controller 30 in electrical communication with the pipette-module motor 16 and the pressure sensor 28. The pipette-module controller 30 has a liquid surface detection mode of operation which enables a pressure feedback control algorithm that causes the pipette-module motor 16 to move the pipette-module translatory-motion frame 14 in a z-axis translatory motion until a change in a pressure in the tip 26, as sensed by the pressure sensor 28, indicates that the tip 26 is in contact with the liquid surface 110 as further described below.

In some embodiments, the pipette-module translatory-motion frame 14 may be attached to the pipette-module frame 12 by a linear slider 36 and operatively coupled to the pipette-module motor 16 by a pipette-module screw 38.

Figure 3:
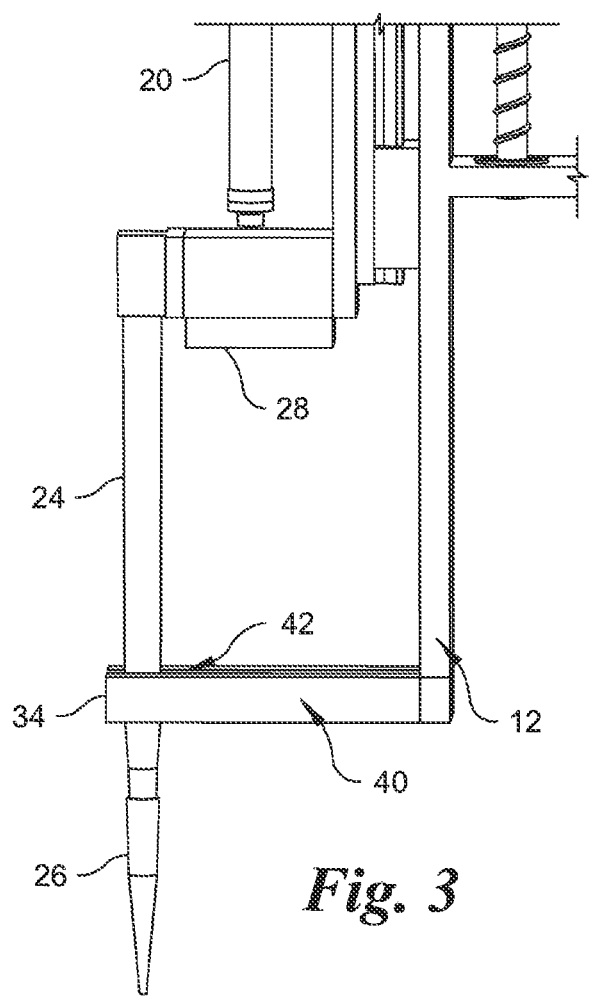
FIG. 3 is an enlarged side elevation view of a portion of the pipette module of FIG. 1 showing the tip remover.

Referring to FIG. 3, in some embodiments, the pipette module 10 may have a tip remover 34 attached to the pipette-module frame 12. The tip remover 34 preferably comprises a pair of first and second parallel tip-remover bars 40 spaced apart by a tip-remover gap 42 greater than an outside diameter of the tube 24 and less than an outside diameter of the tip 26. The tip-remover gap 42 allows the tube 24 to move in z-axis translatory motion between the pair of bars 40 and prevents the tip 26 from passing therethrough. When the tip 26 contacts the pair of bars 40, further z-axis translatory motion of the pipette-module translatory-motion frame 14 separates the tip 26 from the tube 24.

Figure 4:
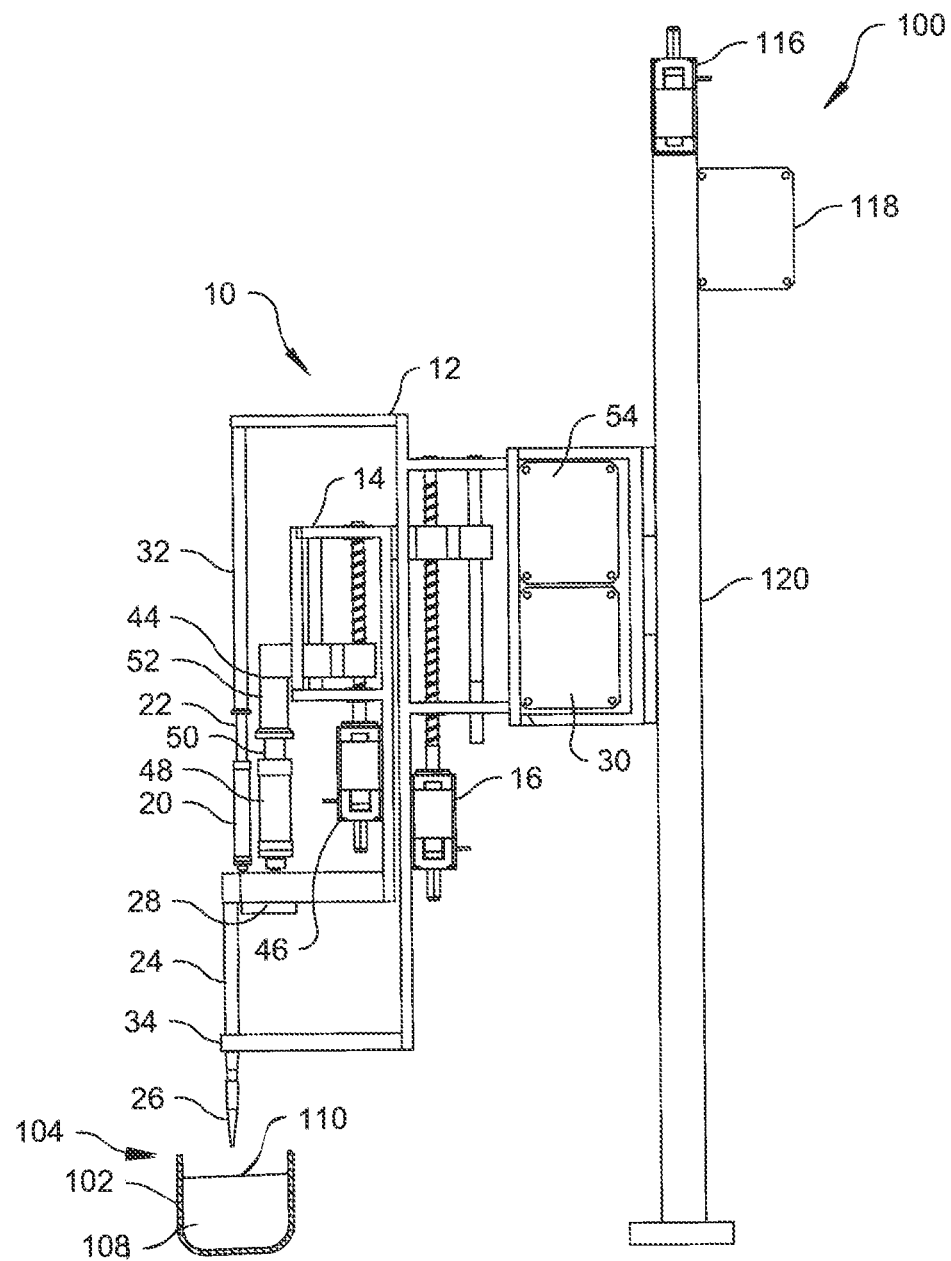
FIG. 4 is a side elevation view of a liquid handling system including the pipette module with two cylinders in accordance with the present invention.

Referring to FIG. 4, in some embodiments the pipette module 10 may have another pipette-module translatory-motion frame 44 attached to the pipette-module translatory-motion frame 14. The attached another pipette-module translatory-motion frame 44 is movable with respect to the pipette-module translatory-motion frame 14 by an another pipette-module translatory-motion-frame motor 46. If the pipette module 10 has an another pipette-module translatory-motion frame 44, the pneumatic aspirator assembly 18 further comprises an another pipette-module cylinder 48 having an another pipette-module-cylinder volume greater than the pipette-module cylinder volume of the pipette-module cylinder 20. The another pipette-module cylinder 48 is movable with the pipette-module translator(translatory)-motion frame 14 and is in fluid communication with the pipette-module cylinder 20, the tube 24, the tip 26 and the pressure sensor 28. An another pipette-cylinder piston 50 is movably disposed in the another pipette-module cylinder 48. The another-cylinder piston 50 is fixedly attached to the another pipette-module cylinder translatory-motion frame 44 by an another pipette-cylinder piston rod 52. An another pipette-module controller 54 is in electrical communication with the another pipette-module cylinder translatory-motion-frame motor 46, the pressure sensor 28 and the pipette-module controller 30.

Referring to FIG. 2, in a preferred embodiment of the liquid handling system 100, a pipette-module mount 114 is attached to the liquid-handling-system z-axis frame 120. The pipette-module mount 114 is movable in a z-axis translatory motion with respect to the liquid-handling-system z-axis frame 120 by a liquid-handling-system z-axis motor 116. At least one pipette module 10 is attached to the pipette-module mount 114 and movable therewith. The liquid-handling-system controller 118 is in electrical communication with the pipette-module controller 30 and the liquid-handling-system z-axis motor 116.

The liquid-handling-system controller 118 is operable in a plurality of modes of operation one of which is a container indexing mode of operation, the enablement of which causes the liquid-handling-system z-axis motor 116 to move the pipette-module mount 114 in a downward z-axis translator (translatory) motion until the tip 26 is in register with the container open end 104.

Another mode of operation for the liquid-handling-system controller 118 is an aspiration mode of operation the enablement of which causes the liquid-handling-system z-axis motor 116 to move the pipette-module mount 114 in an upward z-axis translatory motion while the pipette-module controller 30 simultaneously causes the pipette-module motor 16 to move the pipette-module translatory-motion frame 14 in a downward z-axis translatory motion maintaining the tip 26 in contact with the liquid surface 110 as the liquid is aspirated into the tip 26.

Another mode of operation for the liquid-handling-system controller 118 is a liquid discharging mode of operation the enablement of which causes the liquid-handling-system z-axis motor 116 to move the pipette-module mount 114 in an downward z-axis translatory motion while the pipette-module controller 30 simultaneously causes the pipette-module motor 16 to move the pipette-module translatory-motion frame 14 in an upward z-axis translatory motion discharging from the tip 26 the liquid 108 in the tip 26.

Figure 5:
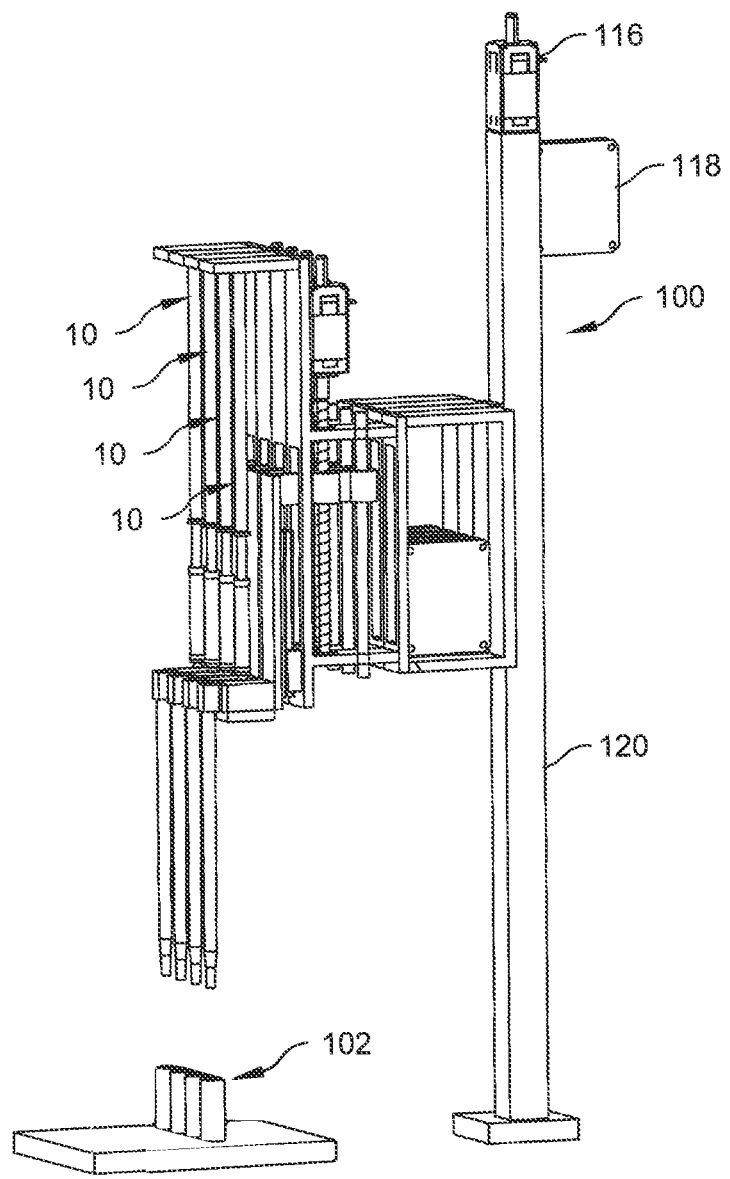
FIG. 5 is a left-side elevation view in perspective of a liquid handling system including multiple single-cylinder pipette modules in accordance with the present invention.
Figure 6:
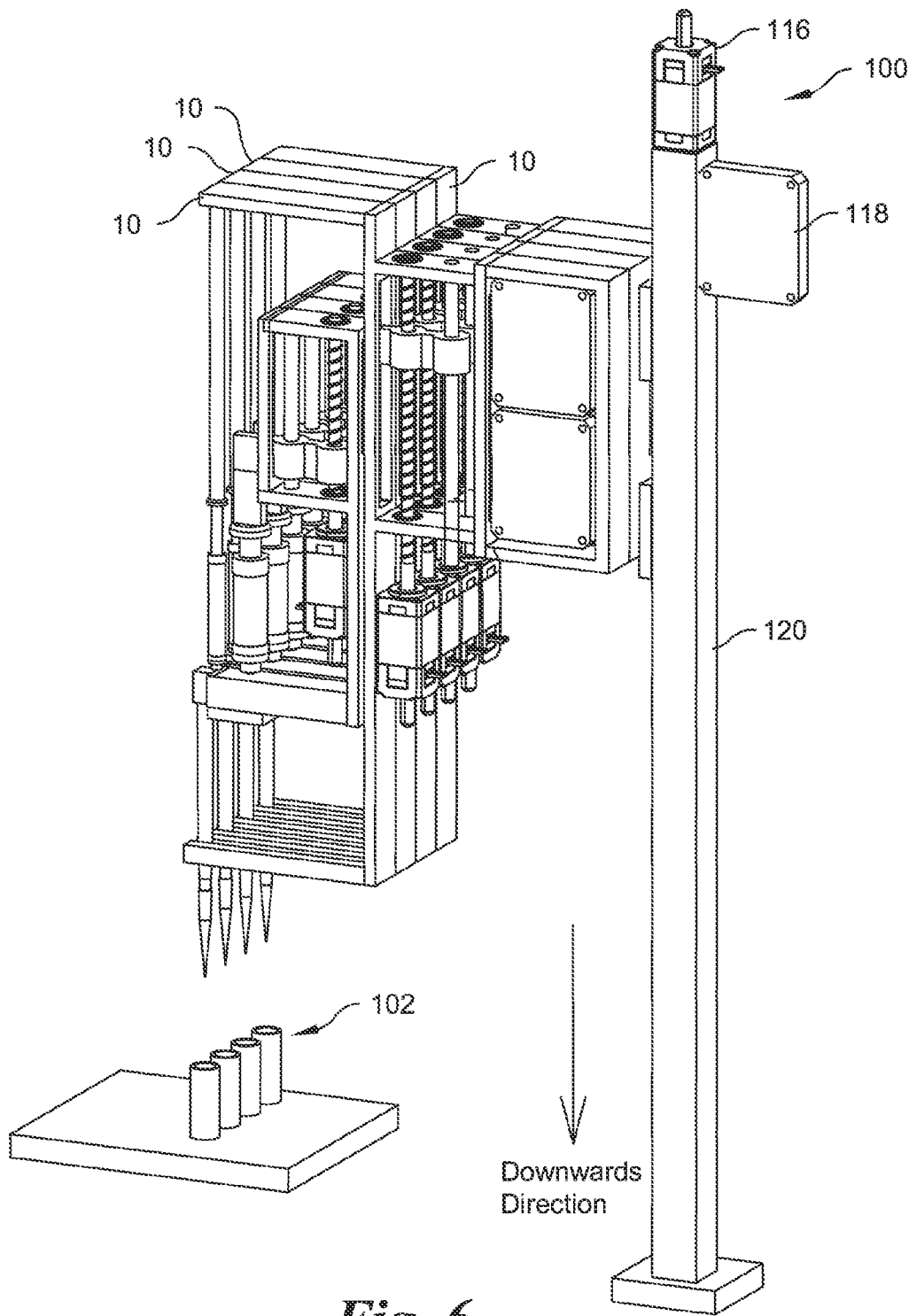
FIG. 6 is a left-side elevation view in perspective of a liquid handling system including multiple two-cylinder pipette modules in accordance with the present invention.

In some embodiments of the liquid handling system 100 two or more containers 102 are provided and at least two pipette modules 10 are provided. The pipette modules may be either single cylinder (see, FIG. 5) or two cylinder (see, FIG. 6) and are attached to the pipette-module mount 114. Enablement of the container indexing mode of operation causes the liquid-handling-system z-axis motor 116 to move the pipette-module mount 114 in a downward z-axis translatory motion until the tip 26 of at least one pipette module of the at least two pipette modules is in register with the container open end 104 of a corresponding container 102.

Enablement of the liquid surface detection mode of operation of each pipette-module of the at least two pipette modules after completion of the container indexing mode of operation independently detects the liquid surface 110 of the liquid 108 in the corresponding container 102.

Enablement of the aspiration mode of operation after completion of the liquid surface detection mode of operation of each pipette-module of the at least two pipette modules causes the liquid-handling-system z-axis motor 116 to move the pipette-module mount 114 in an upward z-axis translatory motion while the pipette-module controller 30 of each pipette-module of the at least two pipette modules simultaneously causes the pipette-module motor 16 of each pipette-module of the at least two pipette modules to move the pipette-module translatory-motion frame 14 of each pipette-module of the at least two pipette modules in a downward z-axis translatory motion maintaining the tip 26 of each pipette-module of the at least two pipette modules in contact with the liquid surface 110 of the corresponding container 102 as the liquid is aspirated into the tip 26 of each pipette-module of the at least two pipette modules.

Enablement of the liquid discharging mode of operation causes the liquid-handling-system z-axis motor 116 to move the pipette-module mount 114 in an downward z-axis translatory motion while the pipette-module controller 30 of each pipette-module of the at least two pipette modules simultaneously causes the pipette-module motor 16 of each pipette-module of the at least two pipette modules to move the pipette-module translatory-motion frame 14 of each pipette-module of the at least two pipette modules in an upward z-axis translatory motion discharging from the tip 26 of each pipette-module of the at least two pipette modules the liquid 108 in the tip 26 of each pipette-module of the at least two pipette modules.

In operation, the origin of the liquid-handling-system z-axis is defined as the position in which the pipette-module mount 114 is in the up-most position and the pipette-module translatory-motion frame 14 is also in the up-most position. As a first step, the liquid-handling-system controller 118 enables the container indexing mode of operation, in which the liquid-handling-system z-axis motor 116 moves the pipette-module mount 114 in a downward z-axis translatory motion until the pipette-module tip 26 is in register with the container open end 104.

In the next step, the liquid-handling-system controller 118 causes the pipette-module controller 30 to activate the pressure feedback control algorithm which encodes the following Proportional, Integral, Derivative (PID) feedback control law:

$$u(t) = u_0(t) + K_P e(t) + K_I \int_0^t e(t')dt' + K_D \frac{de(t)}{dt},$$

where u(t) is a tip speed in mm/sec;
$u(t)_0$ ($u_0(t)$) is an initial value for the tip speed;
$K_P$, $K_I$ and $K_D$ are non-negative constants for the Proportional, Integral, Derivative coefficients of the control law; typically, $K_P=1$, $K_I=0.005$, and $K_D=1$, and
e(t) is a control error and is equal to a target pressure value minus a measured pressure value.

The target pressure point of the control law is set to the atmosphere pressure P0. Once the pressure drop inside of the tip 26 is detected, the target pressure point of the control law is set to a higher value, for example, P0+C, where C is typically equal to 250 Pa for water at room temperature. This higher pressure expels the liquid from of the tip 26. The position of the end of the pipette-module tip 26 is the position of the liquid surface 110 when the pressure P inside the tip equals P0+C.

Figure 7:
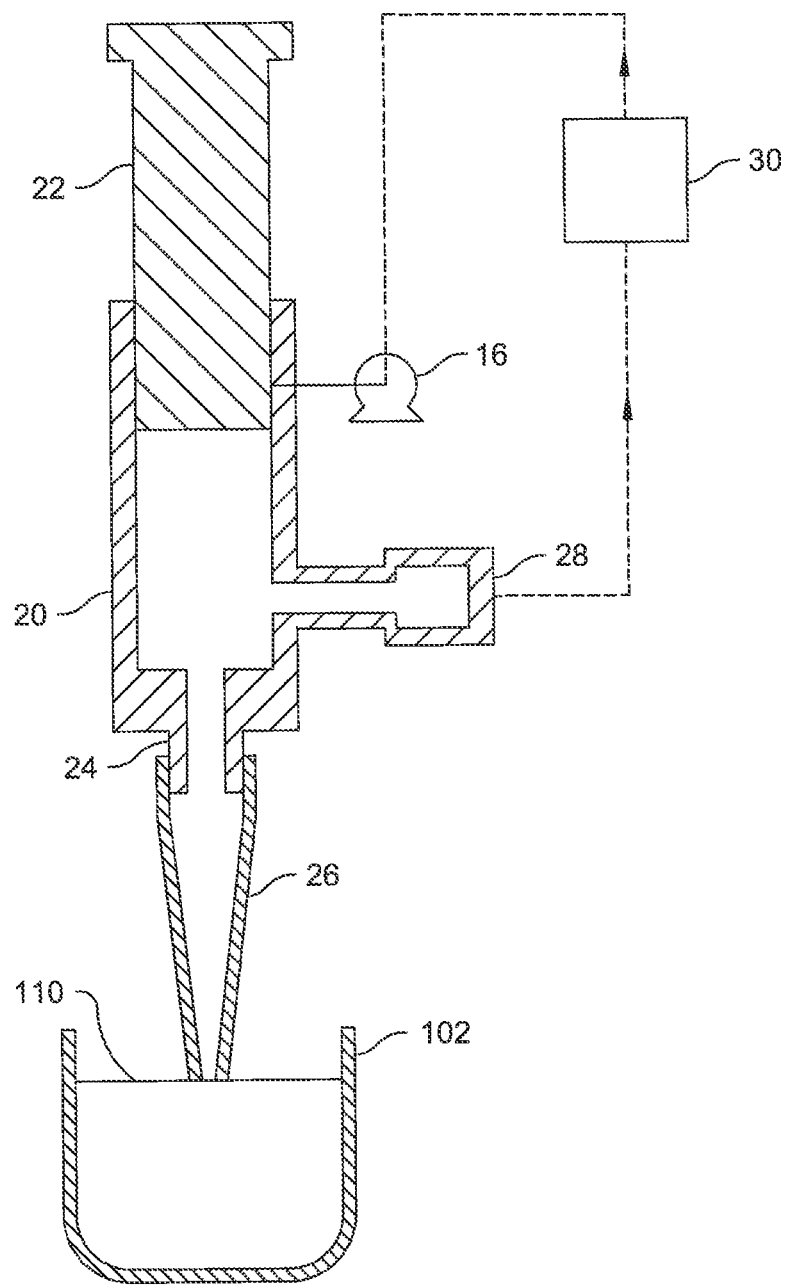
FIG. 7 is schematic diagram of the pressure feedback control system of the pipette module of FIG. 1 in accordance with the present invention.

A schematic of the pressure feedback control system is shown in FIG. 7. The pipette-module piston 22 is movably disposed in the pipette module cylinder 20 and fixedly attached by the piston rod 32 to the pipette-module frame 12. The pipette-module motor 16 drives the tip 26 and the cylinder 20 downwardly toward the liquid surface 110 in the container 102. The liquid surface level 112 in the container 102 is unknown and must be detected. The dashed lines show the data flow of the pressure control system. The pipette-module motor 16 can be an open loop or closed loop controlled motor. The control system for motor 16 is not shown for simplicity, however this motor receives speed commands to make a motion. The pressure controller is preferably the PID controller described above and controls the pressure inside the pipette-module tip 26 to the given target values.

Preferably, but not necessarily, the hardware comprising the pressure feedback control system may have the following features: The typical pressure sensor has RMS=0.0075 hPa, Sensitivity=4096 LSB per hPa, 24 bit resolution. The motor has about 50000 Pulse per rev. The cylinder 20 moves 40 mm when motor rotates 1 revolution. The cylinder's volume is 1 mL and the stroke is 60 mm. The inner diameter of the cylinder is 4.6 mm and the sampling time for the control loop is 10 msec. For an initial controller value of $U_0=8$ mm/sec, the airflow rate is approximately 133 μL/sec.

The operational characteristics of the foregoing control law for detecting an unknown liquid surface 110 for water in a container 102 where the pipette-module tip 26 is initially spaced about 20 mm above the liquid surface, the location of the liquid surface is unknown and the pipette-module tip 26 is lowered at velocity of 8 mm/sec is shown in FIGS. 8.1-8.3. More specifically, the pressure inside the tip and the control error are shown in FIG. 8.1. The motor speed and the motor position are shown in FIG. 8.2.

The motor speed is the output of the pressure feedback controller and the motor position is the output of the pipette module motor 16 which drives the pipette-module cylinder 20 and pipette-module tip 26. After 1500 msec, the position of the pipette-module motor 16 represents the position of liquid surface 110. After the pipette-module tip 26 touches the liquid surface 110, the control error becomes large enough to aspirate the liquid into the pipette-module tip 26. The surface tension between pipette-module tip 26 and water is around 300 Pa. In the motor speed and position plots in FIG. 8.2, the pipette-module motor 16 moves upwardly from a downwardly motion after 1200 msec.

After the pipette-module tip 26 contacts the liquid surface 110, the pipette-module tip 26 moves upwardly. Referring to FIG. 8.3, which shows the control error of FIG. 8.1 and the motor position of FIG. 8.2 for the time interval 1080 msec to 3000 msec, the pipette-module tip 26 moves upwardly about 0.6 mm after the pipette-module tip 26 touches the liquid surface. The control error becomes 700 Pa and the tip pressure decreases to 450 Pa. The pressure drop is about 400 Pa The pressure decrease is large enough to aspirate liquid into the pipette-module tip 26. The decrease in control error signifies that the pipette-module tip pressure increases, since the pressure target value is set to P0+C. The liquid inside the tip discharges with the increase of the pipette-module tip pressure, and is completely discharged when the pipette-module tip pressure reaches the target value of P0+C.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

We claim:

1. A pipette module for a liquid handling system, comprising:
    a) a liquid-handling-system z-axis frame;
    b) at least one container with a container open end having a predetermined container-open-end position (R1) relative to the liquid-handling-system z-axis frame, wherein the at least one container contains a liquid having a liquid surface with a liquid surface level (R2);
    c) a pipette-module frame attachable to the liquid-handling-system z-axis frame via a pipette-module mount wherein the pipette-module mount movable in a z-axis translatory motion with respect to the liquid-handling-system z-axis frame by a liquid-handling-system z-axis motor;
    d) a pipette-module translatory-motion frame attached to the pipette-module frame and movable with respect to the pipette-module frame by a pipette-module motor, and
    e) a pneumatic aspirator assembly comprising:
        i. a pipette-module cylinder having a piston movably disposed therein;
        ii. a tube in fluid communication with the pipette-module cylinder, wherein the tube terminating in a tip;
        iii. a pressure sensor in fluid communication with the pipette-module cylinder, the tube and the tip;
        iv. a pipette-module controller in electrical communication with the pipette-module motor and the pressure sensor;
        v. a liquid-handling-system controller configured to provide a liquid discharging mode of operation which causes the liquid-handling-system z-axis motor to move the pipette-module mount in an downward z-axis translatory motion while the pipette-module controller simultaneously causes the pipette-module motor to move the pipette-module translatory-motion frame in an upward z-axis translatory motion discharging from the tip the liquid in the tip;
    wherein the pipette-module cylinder, the tube and the tip are attached to the pipette-module translatory-motion frame and movable therewith so as to perform liquid surface detection mode independently without moving the pipette-module mount by the liquid-handling-system z-axis motor, and wherein the piston is fixedly attached to the pipette-module frame by a piston rod;
    wherein the pipette-module controller has a liquid surface detection mode of operation which enables a pressure feedback control algorithm that causes the pipette-module motor to move the pipette-module translatory-motion frame in a z-axis translatory motion until a change in a pressure in the tip as sensed by the pressure sensor indicates that the tip is in contact with the liquid surface.

2. The pipette module according to claim 1, wherein the pressure feedback control algorithm encodes the following Proportional Integral Derivative (PID) feedback control law:

$$u(t) = u_0(t) + K_P e(t) + K_I \int_0^t e(t')dt' + K_D \frac{de(t)}{dt},$$

where u(t) is a tip speed in mm/sec;
$u_0(t)$ is an initial value for the tip speed;
KP, KI, and KD are non-negative constants for the Proportional Integral Derivative coefficients of the control law; and
e(t) is a control error and is equal to a target pressure value minus a measured pressure value.

3. The pipette module according to claim 1, wherein the pipette-module translatory-motion frame is attached to the pipette-module frame by a linear slider and operatively coupled to the pipette-module motor by a screw.

4. The pipette module according to claim 1, further comprising a tip remover attached to the pipette-module frame for movement therewith, the tip remover having a pair of first and second parallel tip-remover bars spaced apart by a tip-remover gap having a diameter greater than an outside diameter of the tube and less than an outside diameter of the tip, wherein the tip-remover gap allows the tube to move in z-axis translatory motion between the pair of tip-remover bars and prevents the tip from passing therethrough and when the tip contacts the pair of tip-remover bars, further z-axis translatory motion of the pipette-module translatory-motion frame separates the tip from the tube.

5. The pipette module according to claim 1, further comprising:
  a) another pipette-module translatory-motion frame attached to the pipette-module translatory-motion frame and movable with respect to the pipette-module translatory-motion frame by an another pipette-module translatory-motion-frame motor; and
  b) another pneumatic aspirator assembly further comprising:
    i. an another pipette-module cylinder having an another pipette-module-cylinder volume greater than pipette-module cylinder volume of the pipette-module cylinder, the another pipette-module cylinder movable with the pipette-module translatory-motion frame and in fluid communication with the pipette-module cylinder, the tube, the tip and the pressure sensor; and
    ii. an another pipette-cylinder piston movably disposed in the another pipette-module cylinder, the another pipette-cylinder piston fixedly attached to the another pipette-module translatory-motion frame by an another pipette-cylinder piston rod;
    iii. an another pipette-module controller in electrical communication with the another pipette-module translatory-motion-frame motor, the pressure sensor and the pipette module controller; and
    iv. a liquid-handling-system controller wherein the liquid-handling-system controller has an aspiration mode of operation, the enablement of which causes the liquid-handling-system z-axis motor to move the pipette-module mount in an upward z-axis translatory motion while the pipette-module controller simultaneously causes the pipette-module motor to move the pipette-module translatory-motion frame in a downward z-axis translatory motion maintaining the tip in contact with the liquid surface as the liquid is aspirated into the tip, and
    v. the another pipette-module controller causes the another pipette-module cylinder translatory-motion-frame motor to move the another pipette-module cylinder translatory-motion frame in the upward z-axis translatory motion coordinated with the downward z-axis translatory motion of the pipette-module translatory-motion frame.

6. A liquid handling system for aspirating a liquid from at least one container having a container open end with a predetermined container-open-end position (R1) relative to the liquid-handling-system, the liquid in the at least one container having a liquid surface with a liquid surface level (R2), the liquid handling system comprising:
  a) a liquid-handling-system z-axis frame;
  b) a pipette-module mount attached to the liquid-handling-system z-axis frame and movable in a z-axis translatory motion with respect to the liquid-handling-system z-axis frame by a liquid-handling-system z-axis motor;
  c) at least one pipette module attached to the pipette-module mount and movable therewith, the pipette module comprising:
    i. a pipette-module frame attachable to the liquid-handling-system z-axis frame;
    ii. a pipette-module translatory-motion frame attached to the pipette-module frame and movable in a z-axis translatory motion with respect to the pipette-module frame by a pipette-module motor;
    iii. a pneumatic aspirator assembly comprising:
      a pipette-module cylinder having a piston movably disposed therein;
      a tube in fluid communication with the pipette-module cylinder, the tube terminating in a tip; and
      a pressure sensor in fluid communication with the cylinder, the tube and the tip; and
      a pipette-module controller in electrical communication with the pipette-module motor and the pressure sensor,
    wherein the pipette-module cylinder, the tube and the tip are attached to the pipette-module translatory-motion frame and movable therewith so as to perform liquid surface detection mode independently without moving the pipette-module mount by the liquid-handling-system z-axis motor, and wherein the piston is fixedly attached to the pipette-module frame by a piston rod; and
    the pipette-module controller has a liquid surface detection mode of operation which enables a pressure feedback control algorithm that causes the pipette-module motor to move the pipette-module translatory-motion frame in a z-axis translatory motion until a change in a pressure in the tip as sensed by the pressure sensor indicates that the tip is in contact with the liquid surface; and
    a liquid-handling-system controller in electrical communication with the pipette-module controller and the liquid-handling-system z-axis motor, characterized in that: wherein the liquid-handling-system controller has a container indexing mode of operation, the enablement of which causes the liquid-handling-system z-axis motor to move the pipette-module mount in a downward z-axis translator motion until the tip is in register with the container open end, wherein the at least one container is two or more containers; the at least one pipette module is two or more pipette modules and wherein the two or more pipette module are able to simultaneously and independently detect the liquid surface of the liquid in the corresponding container in the liquid surface detection mode; and wherein the liquid-handling-system controller is further configured to provide a liquid discharging mode of operation which causes the liquid-handling-system z-axis motor to move the pipette-module mount in an downward z-axis translatory motion while the pipette-module controller simultaneously causes the pipette-module motor to move the pipette-module translatory-motion frame in an upward z-axis translatory motion discharging from the tip the liquid in the tip.

7. The liquid handling system according to claim 6, wherein the pipette-module controller enables the liquid surface detection mode of operation after completion of the container indexing mode of operation.

8. The liquid handling system according to claim 6, wherein the liquid-handling-system controller has an aspiration mode of operation, the enablement of which causes the liquid-handling-system z-axis motor to move the pipette-module mount in an upward z-axis translatory motion while the pipette-module controller simultaneously causes the pipette-module motor to move the pipette-module translatory-motion frame in a downward z-axis translatory motion maintaining the tip in contact with the liquid surface as the liquid is aspirated into the tip.

9. The liquid handling system according to claim 6, wherein the pipette-module controller enables the liquid surface detection mode of operation after completion of the container indexing mode of operation and the liquid-handling-system controller enables the aspiration mode of operation after completion of the liquid surface detection mode of operation.

10. The liquid handling system according to claim 6, wherein the pipette-module controller enables the liquid discharging mode of operation after completion of the aspiration mode of operation.

11. The liquid handling system according to claim 6, wherein:

enablement of the container indexing mode of operation causes the liquid-handling-system z-axis motor to move the pipette-module mount in a downward z-axis translatory motion until the tip of at least one pipette module of the at least two pipette modules is in register with the container open end of a corresponding container;

enablement of the liquid surface detection mode of operation of each pipette-module of the at least two pipette modules after completion of the container indexing mode of operation independently detects the liquid surface of the liquid in the corresponding container;

enablement of the aspiration mode of operation after completion of the liquid surface detection mode of operation of each pipette-module of the at least two pipette modules causes the liquid-handling-system z-axis motor to move the pipette-module mount in an upward z-axis translatory motion while the pipette-module controller of each pipette-module of the at least two pipette modules simultaneously causes the pipette-module motor of each pipette-module of the at least two pipette modules to move the pipette-module translatory-motion frame of each pipette-module of the at least two pipette modules in a downward z-axis translatory motion maintaining the tip of each pipette-module of the at least two pipette modules in contact with the liquid surface of the corresponding container as the liquid is aspirated into the tip of each pipette-module of the at least two pipette modules; and enablement of the liquid discharging mode of operation causes the liquid-handling-system z-axis motor to move the pipette-module mount in an downward z-axis translatory motion while the pipette-module controller of each pipette-module of the at least two pipette modules simultaneously causes the pipette-module motor of each pipette module of the at least two pipette modules to move the pipette-module translatory-motion frame of each pipette-module of the at least two pipette modules in an upward z-axis translatory motion discharging from the tip of each pipette-module of the at least two pipette modules the liquid in the tip of each pipette-module of the at least two pipette modules.

* * * * *